United States Patent
Hijikata

(10) Patent No.: US 10,530,284 B2
(45) Date of Patent: Jan. 7, 2020

(54) MOTOR CONTROL DEVICE AND MOTOR CONTROLLING METHOD

(71) Applicant: Minebea Mitsumi Inc., Nagano (JP)

(72) Inventor: Hidetoshi Hijikata, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/538,823

(22) PCT Filed: Dec. 25, 2015

(86) PCT No.: PCT/JP2015/086310
§ 371 (c)(1),
(2) Date: Jun. 22, 2017

(87) PCT Pub. No.: WO2016/104737
PCT Pub. Date: Jun. 30, 2016

(65) Prior Publication Data
US 2017/0373622 A1    Dec. 28, 2017

(30) Foreign Application Priority Data
Dec. 26, 2014 (JP) .................................. 2014-265183

(51) Int. Cl.
*H02P 8/12* (2006.01)
*H02P 8/22* (2006.01)
(Continued)

(52) U.S. Cl.
CPC .......... *H02P 8/22* (2013.01); *H02M 7/53871* (2013.01); *H02P 7/04* (2016.02); *H02P 7/29* (2013.01);
(Continued)

(58) Field of Classification Search
CPC ...... H02P 2205/01; H02P 29/032; H02P 7/04; H02P 7/29; H02P 8/12; H02P 8/18;
(Continued)

(56) References Cited

U.S. PATENT DOCUMENTS 5,708,578 A * 1/1998 Stoddard ........... H02M 7/53871
363/95
5,818,178 A * 10/1998 Marumoto ............ H02P 7/0094
318/400.32
(Continued)

FOREIGN PATENT DOCUMENTS

| JP | 2002-204150 A | 7/2002 |
|---|---|---|
| JP | 2011-078301 A | 4/2011 |
| JP | 2014-053997 A | 3/2014 |

OTHER PUBLICATIONS

International Search Report and Written Opinion from Corresponding Application No. PCT/JP2015/086310; dated Mar. 15, 2016.
(Continued)

*Primary Examiner* — Muhammad S Islam
(74) *Attorney, Agent, or Firm* — Pearne & Gordon LLP

(57) ABSTRACT

This motor control device has an inexpensive configuration and enhances motor current target value tracking. This motor control device has an H bridge circuit that has a switching element and is connected to a motor coil provided in a motor, and a control means that drives the switching element at each prescribed PWM period and specifies an operation mode for the H bridge circuit from among a charge mode for increasing the motor current (Icoil) flowing through the motor coil, a fast decay mode for decreasing the motor current, and a slow decay mode. In each PWM period, the control means selects one of the operation modes on the basis of the result of comparing the motor current and a current reference value (Iref) before the time that has passed from the start of the PWM period reaches a prescribed
(Continued)

current control re-execution time (Tr) and selects one of the operation modes on the basis of the result of comparing the motor current and the current reference value after the time that has passed reaches the current control re-execution time.

7 Claims, 15 Drawing Sheets

(51) Int. Cl.
*H02P 29/40* (2016.01)
*H02P 7/03* (2016.01)
*H02P 29/032* (2016.01)
*H02M 7/5387* (2007.01)
*H02P 7/29* (2016.01)
*H02P 8/18* (2006.01)
*H02M 3/155* (2006.01)

(52) U.S. Cl.
CPC .................. *H02P 8/12* (2013.01); *H02P 8/18* (2013.01); *H02P 29/032* (2016.02); *H02P 29/40* (2016.02); H02M 2003/1555 (2013.01); H02P 2205/01 (2013.01)

(58) Field of Classification Search
CPC .... H02P 8/22; H02P 8/32; H02M 2003/1555; H02M 7/53871
See application file for complete search history.

(56) References Cited

U.S. PATENT DOCUMENTS

| | | | | |
|---|---|---|---|---|
| 6,049,184 A | * | 4/2000 | Uggla | H02P 8/12 318/254.2 |
| 6,066,930 A | * | 5/2000 | Horiguchi | H02P 8/12 318/400.29 |
| 6,119,046 A | * | 9/2000 | Sporer | H02M 7/53871 318/696 |
| 6,943,514 B1 | * | 9/2005 | Chen | H02P 7/29 318/400.09 |
| 2009/0206788 A1 | * | 8/2009 | Ando | H02P 8/22 318/696 |
| 2011/0057600 A1 | * | 3/2011 | Suda | H02P 8/12 318/696 |

OTHER PUBLICATIONS

Manea, Sorin, "Stepper Motor Control with dsPIC DSCs", Microchip AN1037, 2009, Microchip Technolgoy Inc. DSO1307A, p. 1.
WWW.st.com, "Integrated stepper motor driver for bipolar stepper motors with microstepping and programmable current profile", Sep. 2013, Doc. ID 11778 Rev 7, p. 1-40.

\* cited by examiner

MOTOR CONTROL DEVICE AND MOTOR CONTROLLING METHOD

TECHNICAL FIELD

The present invention relates to a motor control device and a motor controlling method that are suitable for controlling a stepping motor.

BACKGROUND ART

Patent Literature 1 discloses a technique of driving a stepping motor by PWM control. According to this technique, control based on a "charge mode", a "fast decay mode", and a "slow decay mode" is repeated for each PWM period. Here, the charge mode is an operation mode in which the current supplied to the stator winding is increased, and the fast decay mode is an operation mode in which the current is decreased at a high speed, and the slow decay mode is an operation mode in which the current is decreased at a low speed. In the following description, the fast decay mode and the slow decay mode are collectively referred to simply as a "decay mode" in some cases.

These operation modes are switched one another based on a comparison between a measured current value and a target value of the current supplied to the stepping motor (for example, a waveform approximating a sine wave by a stepwise wave). That is, if the measured current value is equal to or less than the target value, the charge mode is selected, and when the measured current value exceeds the target value, the decay mode may be selected. However, in any of the operation modes, it is difficult to predict the waveform of the measured current value in advance. First, the current waveform in the charge mode varies depending on a drive voltage of the motor, a rotational speed of the motor, a load torque condition of the motor, a temperature environment, and the like.

Also, since the inductance of the stator winding varies depending on the positional relationship between a rotor and a stator, the decay speed of the current in the decay mode also varies according to this positional relationship. When the measured current value deviates from the predicted value, for example, a situation where the measured current value drops greatly occurs, the ripple of the current waveform becomes large in order to compensate for the drop. As a result, torque loss, oscillation, noise, or the like of the motor occurs, and frequent switching of the coil current direction between the charge mode and the fast decay mode may cause electromagnetic noise.

In order to cope with such a problem, in the technique of Patent Literature 1, two comparators are provided to compare the measured current value with two reference values, and the operation mode is switched based on the comparison result and the time. As another method, a method to suppress the ripple by shortening the PWM period is also conceivable.

CITATION LIST

Patent Literature

Patent Literature 1: JP-A-2002-204150

SUMMARY OF THE INVENTION

Technical Problem

However, providing two comparators as in Patent Literature 1 leads to an increase in cost. Also, shortening the PWM period requires a controller that can handle a high-speed operation, which again leads to an increase in cost.

The present invention has been made in view of the above circumstances, and one of objects thereof is to provide a motor control device and a motor controlling method which can improve the followability of a motor current with respect to a target value while configuring the device at a low cost.

Solution to Problem

In order to solve the above-mentioned problem, according to the present invention, there is provided a motor control device including:

an H-bridge circuit that includes a switching element and a diode and is connected to a motor coil provided in a motor; and a controller that drives the switching element every predetermined PWM period and designates an operation mode from among a plurality of modes including a charge mode in which a motor current flowing in the motor coil increases, a fast decay mode in which the motor current is decreased, and a slow decay mode in which the motor current is decreased at a decay speed slower than that of the fast decay mode for the H-bridge circuit.

The controller selects one of the operation modes based on a comparison result between the motor current and a current reference value before an elapsed time from the start of each PWM period reaches a predetermined current control re-execution time, and selects one of the operation modes based on a comparison result between the motor current and the current reference value after the elapsed time reaches the current control re-execution time.

ADVANTAGEOUS EFFECTS OF THE INVENTION

According to the present invention, it is possible to improve the followability of a motor current with respect to a target value while configuring the device at a low cost.

DESCRIPTION OF EMBODIMENTS

[Configuration of Embodiment] (Overall Configuration)

Next, with reference to FIG. 1, the overall configuration of a motor control system according to an embodiment of the present invention will be described.

Figure 1:
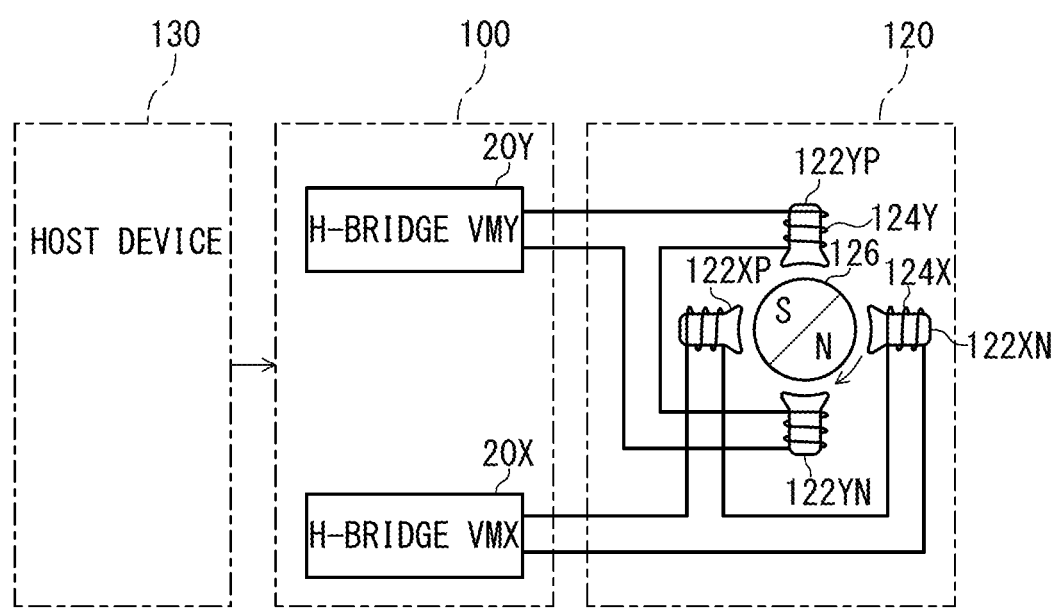
FIG. 1 is an overall block diagram of a motor control system according to an embodiment of the present invention.

In FIG. 1, a stepping motor (example of motor) 120 is a bipolar type two-phase stepping motor, and includes a rotor 126 having a permanent magnet and provided rotatably, and stators provided at each position equally dividing the circumference of the rotor 126 into four in the circumferential direction. These stators consist of X-phase stators 122XP and 122XN and Y-phase stators 122YP and 122YN. Each of these stators has a winding wound therearound. The windings wound around the stators 122YP and 122YN are connected in series, and these windings are collectively referred to as "stator winding 124Y". Similarly, the windings wound around the stators 122XP and 122XN are connected in series, and these windings are collectively referred to as "stator winding 124X".

A host device 130 outputs a speed command signal for indicating the rotational speed of the stepping motor 120. A motor control device 100 drives and controls the stepping motor 120 in accordance with this speed command signal. The motor control device 100 is provided with H-bridge circuits 20X and 20Y, and applies an X-phase voltage VMX and a Y-phase voltage VMY to the stator windings 124X and 124Y, respectively.

(Motor Control Device 100)

Next, with reference to FIG. 2, the details of the motor control device 100 will be described. Although FIG. 1 shows the two systems of stator windings 124X and 124Y and the two systems of H-bridge circuits 20X and 20Y, these are collectively referred to as one system of a stator winding 124 and one system of an H-bridge circuit 20.

A CPU (Central Processing Unit; example of controller) 101 provided inside the motor control device 100 controls each unit via a bus 106 based on a control program stored in a ROM (Read Only Memory) 103. A RAM (Random Access Memory) 102 is used as a work memory of the CPU 101. A timer 104 measures the elapsed time from the reset timing under the control of the CPU 101. An I/O port 105 inputs and outputs signals to and from the host device 130 shown in FIG. 1 and other external devices. A bridge controller 107 controls each unit of a bridge control circuit 110 based on a command from the CPU 101.

Here, the bridge control circuit 110 is configured as a single integrated circuit. In the bridge control circuit 110, a PWM signal generator 113 generates a PWM signal and supplies the PWM signal to the H-bridge circuit 20 under the control of the bridge controller 107. The H-bridge circuit 20 includes FETs (Field-Effect Transistors) 2, 4, 6, 8, 15, and 17, and the PWM signal is an on/off signal applied as a gate voltage to these FETs. In the figure, the lower terminal of these FETs is the source terminal and the upper terminal is the drain terminal.

The FETs 2 and 4 are coupled in series, and a DC power supply 140 and a ground wire 142 are connected to the series circuit, and a predetermined voltage Vdd is applied thereto. Similarly, the FETs 6 and 8 are also coupled in series, and the voltage Vdd is applied to the series circuit. Diodes 12, 14, 16, and 18 are diodes for reflux, and are coupled in parallel to the FETs 2, 4, 6, and 8. The FETs 15 and 17 are provided for current detection, and form a current mirror circuit together with the FETs 4 and 8, respectively. As a result, a current proportional to the current flowing in the FETs 4 and 8 flows in the FETs 15 and 17, respectively.

The voltage VMout0 at the connection point of the FETs 2 and 4 is applied to one end of the stator winding 124 of the motor. The voltage VMout1 at the connection point of the FETs 6 and 8 is applied to the other end of the stator winding 124. Therefore, the motor voltage VM (=voltage VMout0−VMout1), which is the difference between them, is applied to the stator winding 124. Actually, the motor voltage VM is the X-phase voltage VMX and the Y-phase voltage VMY shown in FIG. 1.

A current detector 116 measures the current value flowing in the FETs 15 and 17 according to the current direction, thereby outputting the measured current value Icoil of the current flowing through the stator winding 124. A D/A converter 115 receives the digital value of the current reference value Iref from the bridge controller 107, and converts the digital value into an analog value. A comparator 114 compares the measured current value Icoil with the current reference value Iref of the analog value, outputs a "1" signal when the former becomes equal to or larger than the latter, and outputs a "0" signal in other cases.

However, chattering may occur in the output signal of the comparator 114 due to the influence of noise or the like. A current filter 111 is provided to exclude this chattering. That is, when the output signal of the comparator 114 is switched, the current filter 111 waits for a predetermined filter time Tft and determines again whether or not the output signal of the comparator 114 is held at the value after switching. When the determination result is affirmative, the value after the switching is outputted as a threshold excess flag CL.

Voltages VMout0 and VMout1 are also supplied to an A/D converter 117 and a BEMF (back electromotive force) detector 118. When the motor voltage VM is a back electromotive force, that is, during a period when no voltage is applied from the H-bridge circuit 20, the BEMF detector 118 outputs a flag ZC according to switching of the voltage direction (zero crossing). The A/D converter 117 measures and outputs the back electromotive force Vbemf of the stator winding 124 based on the voltages VMout0 and VMout1. This back electromotive force Vbemf is used for detecting stall of synchronism (step loss).

In addition, the bridge controller 107 outputs the current control enable flag CLM. This flag CLM is a flag that becomes "1" when changing the PWM signal supplied to the H-bridge circuit 20 is enabled and "0" when the changing is disabled. When the flag CLM is "0", a current limit controller 112 controls the PWM signal generator 113 so as to hold the present PWM signal.

[Outline of Operation of Embodiment] (Operation Mode of H-Bridge Circuit 20)

Next, the operation mode of the H-bridge circuit 20 will be described with reference to FIGS. 3A to 3F.

Figure 3A:
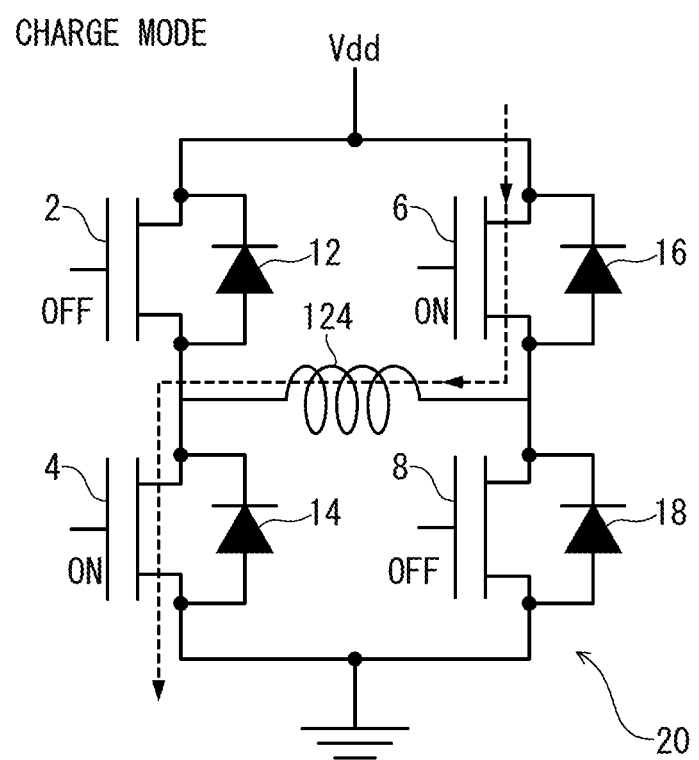
FIG. 3A is an explanatory diagram of an operation mode of an H-bridge circuit, and is the explanatory diagram of a charge mode.

In the case of increasing the absolute value of the motor current flowing through the stator winding 124, as shown in FIG. 3A, two obliquely opposed FETs are turned on. In the illustrated example, the FETs 4 and 6 are in an ON state and the FETs 2 and 8 are in an OFF state. In this state, the motor current flows through the FET 6, the stator winding 124, and the FET 4 in the direction indicated by the broken line, and the motor current increases. This operation mode is referred to as "charge mode".

Figure 3B:
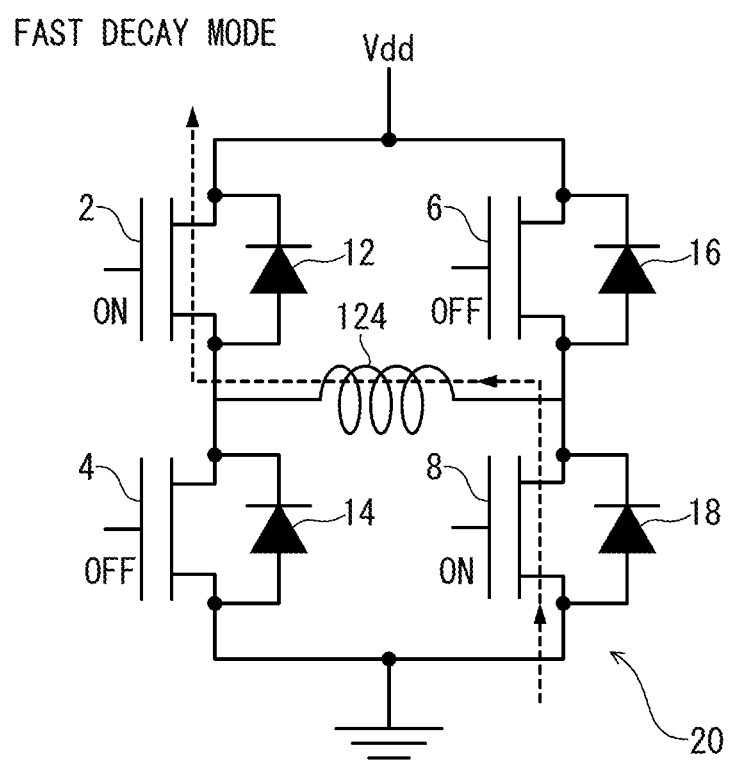
FIG. 3B is an explanatory diagram of an operation mode of the H-bridge circuit, and is the explanatory diagram of a fast decay mode.

In the case of decreasing the motor current at a high speed from the state of FIG. 3A, as shown in FIG. 3B, the FETs 4 and 6 are turned off and the FETs 2 and 8 are turned on. Since a back electromotive force is generated in the stator winding 124, a current flows through the FET 8, the stator winding 124, and the FET 2 in a direction indicated by the broken line, and the current is decreased at a high speed. This operation mode is referred to as "fast decay mode".

Figure 3C:
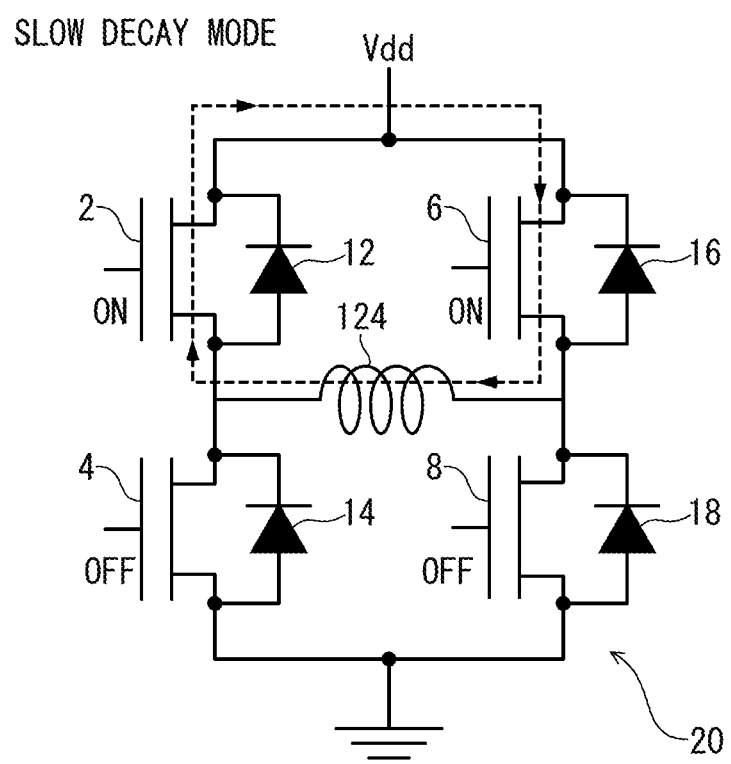
FIG. 3C is an explanatory diagram of an operation mode of the H-bridge circuit, and is the explanatory diagram of an example of a slow decay mode.

Further, when decreasing the current at a low speed from the state of FIG. 3A or 3B, as shown in FIG. 3C, the FETs 2 and 6 on the voltage Vdd side are turned on, and the FETs 4 and 8 on the ground potential side are turned off. Then, a current looping through the FETs 2 and 6 and the stator winding 124 flows as indicated by the broken line in the figure. This current is decreased by the impedances of the FETs 2 and 6 and the stator winding 124, but the decay speed is low. This operation mode is referred to as "slow decay mode".

Figure 3D:
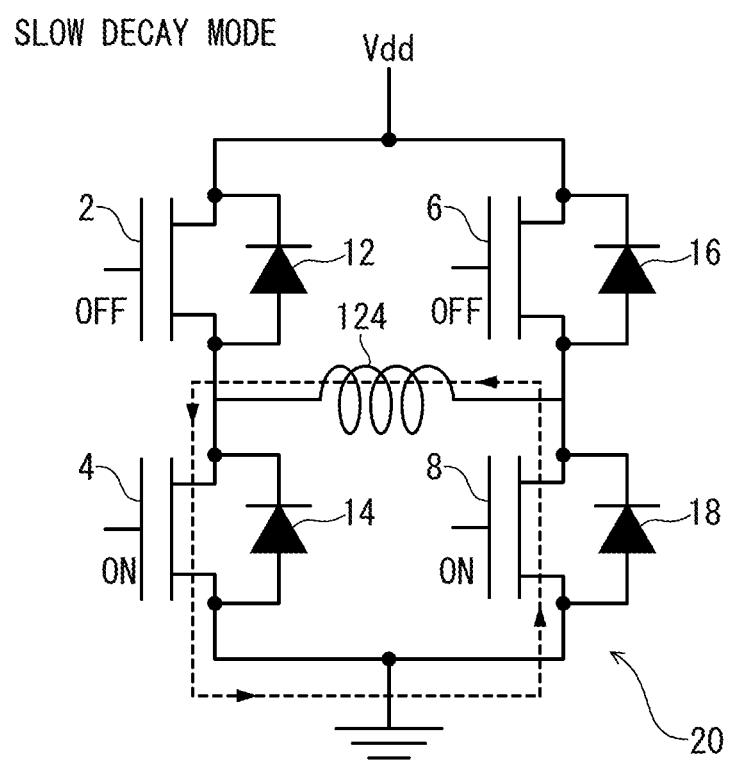
FIG. 3D is an explanatory diagram of the operation mode of the H-bridge circuit, and is the explanatory diagram of another example of the slow decay mode.

Further, as a variation of the slow decay mode, as shown in FIG. 3D, the FETs 2 and 6 on the voltage Vdd side may be turned off and the FETs 4 and 8 on the ground potential side may be turned on. Then, a motor current that loops through the FETs 4 and 8 and the stator winding 124 flows as shown by the broken line in the figure. Although this current is decreased by the impedances of the FETs 4 and 8 and the stator winding 124, again the decay speed is low.

By the way, even if the gate voltage of any FET is turned off, due to the parasitic capacitance of the FET, the FET remains in the ON state for a while. Thus, for example, when instantaneously switching from the charge mode (FIG. 3A) to the fast decay mode (FIG. 3B), all the FETs are instantaneously turned on, a short circuit occurs between the voltage Vdd and the ground potential, and the FET is destroyed. In order to prevent such a situation, the H-bridge circuit 20 is set to the operation mode referred to as "shoot through protection mode".

Figure 3E:
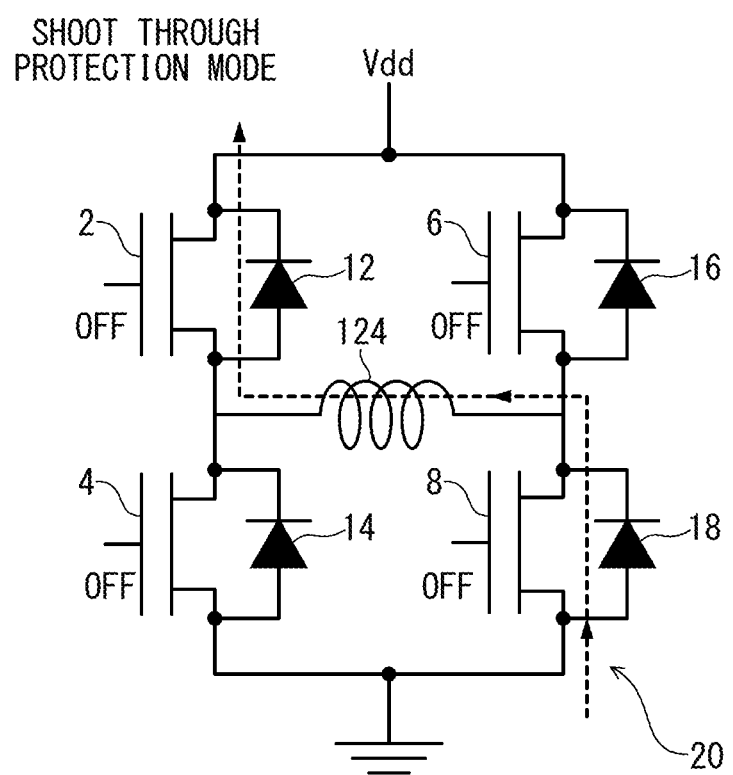
FIG. 3E is an explanatory diagram of an operation mode of the H-bridge circuit, and is the explanatory diagram of an example of a shoot through protection mode.

FIG. 3E shows a shoot through protection mode in which all the FETs 2, 4, 6, and 8 are turned off. When switched from the charge mode of FIG. 3A to the shoot through protection mode of FIG. 3E, a back electromotive force is generated in the stator winding 124, so that the motor current flows through the diode 18, the stator winding 124, and the diode 12 in the direction indicated by the broken line. In the shoot through protection mode of FIG. 3E, the energy dissipation with the forward voltage drop of the diodes 12 and 18 occurs, so that the decay speed of the motor current is the largest.

Figure 3F:
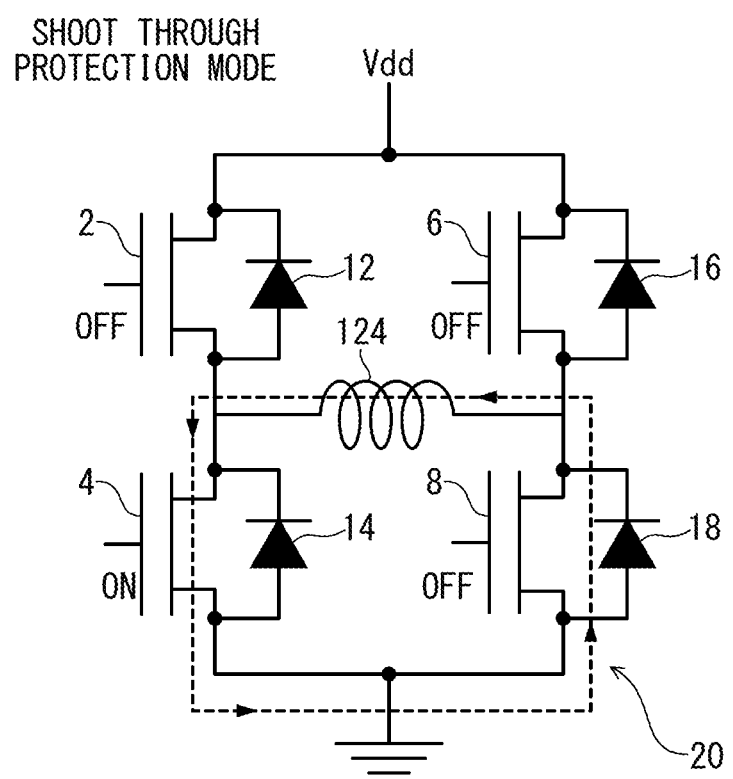
FIG. 3F is an explanatory diagram of the operation mode of the H-bridge circuit, and is an explanatory diagram of another example of the shoot through protection mode.

Here, when comparing the charge mode of FIG. 3A and the slow decay mode of FIG. 3D, in both cases, the FET 4 is in the ON state. Therefore, in the case of transitioning from the state of FIG. 3A to the state of FIG. 3D, the FET 4 may remain in the ON state. In such a case, as shown in FIG. 3F, it is possible to adopt a shoot through protection mode in which the FET 4 is turned on and the FETs 2, 6, and 8 are turned off. In this case, a motor current looping through the FET 4, the diode 18, and the stator winding 124 flows as indicated by the broken line in the figure.

In the state of FIG. 3F, the energy dissipation with the forward voltage drop of the diode 18 occurs, so that the decay speed becomes larger than that in the slow decay mode, but compared with the fast decay mode or the shoot through protection mode of FIG. 3E, the decay speed can be lowered by far. In the case of transitioning from the charge mode or the fast decay mode to the slow decay mode, "it is not desirable to decrease the motor current greatly", as shown in FIG. 3F, so that the shoot through protection mode in which only one FET is turned on is selected.

However, in FIG. 1, the operation mode designated by the CPU 101 to the bridge controller 107 is one of the charge mode, the slow decay mode and the fast decay mode, and even in a control program to be described later, the shoot through protection mode is not designated explicitly. However, the bridge controller 107 does not immediately reflect the designated operation mode, but always inserts the shoot through protection mode (FIG. 3E or 3F) between the operation modes and controls the PWM signal generator 113.

(Setting of Current Reference Value)

Figure 2:
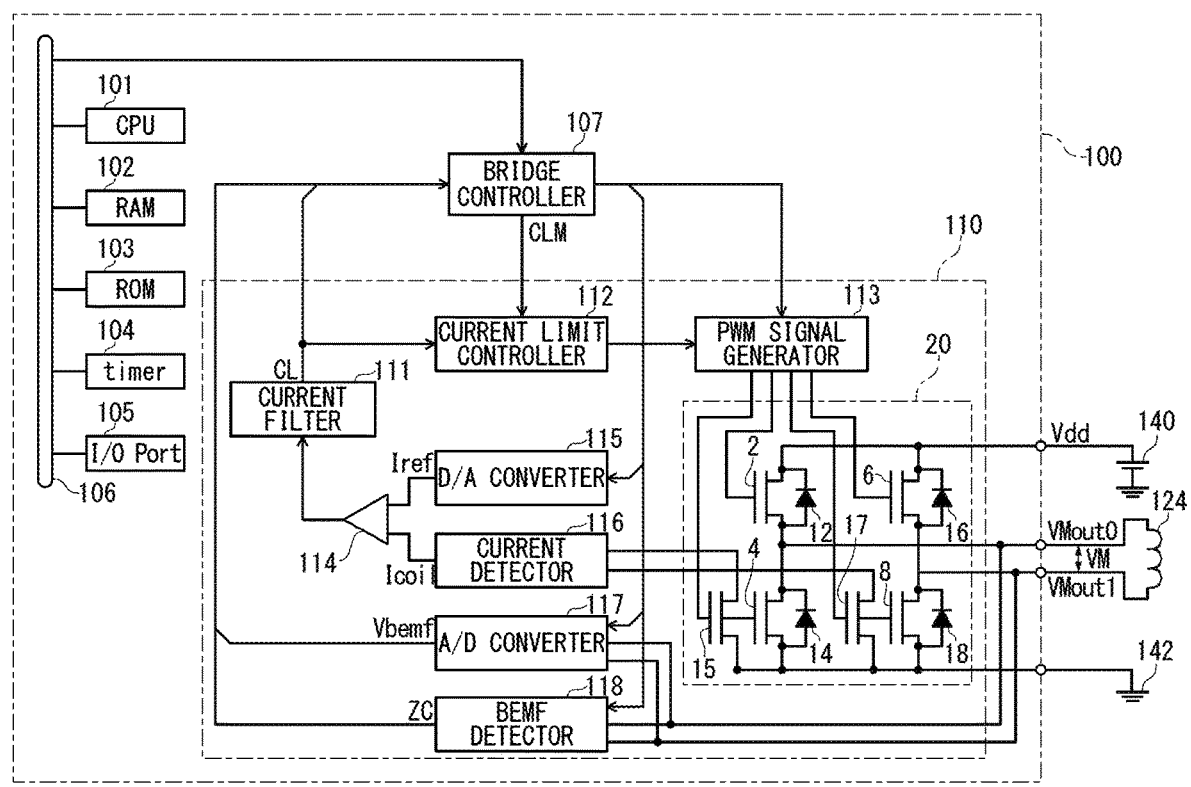
FIG. 2 is a detailed block diagram of a motor control device.
Figure 4A:
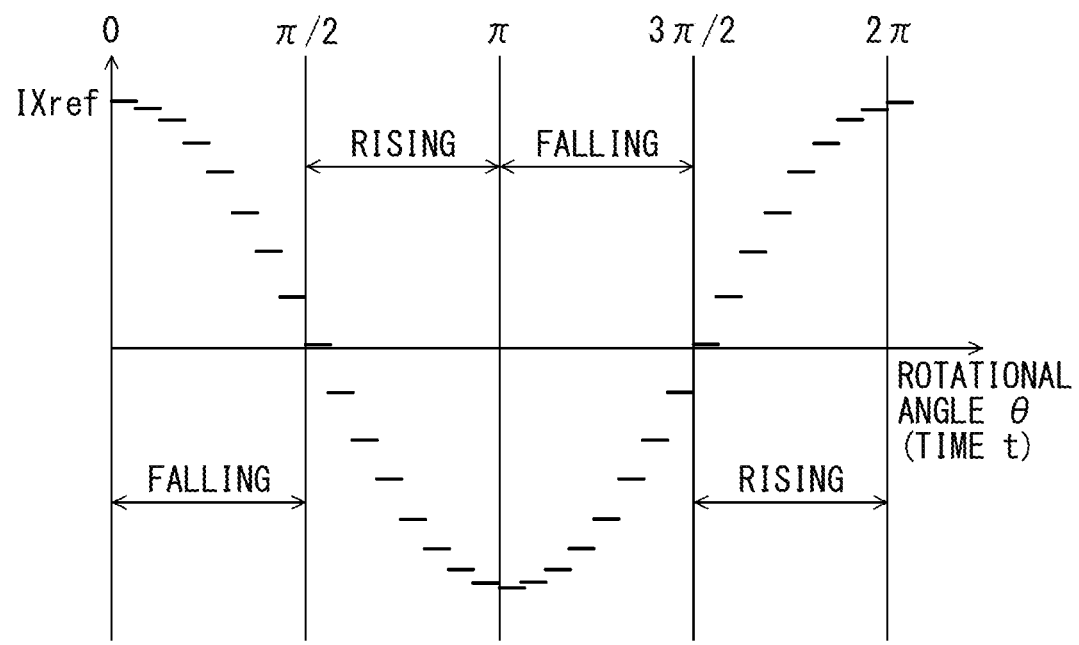
FIG. 4A is a diagram showing an example of a waveform diagram of a current reference value with respect to a rotational angle of a motor.
Figure 4B:
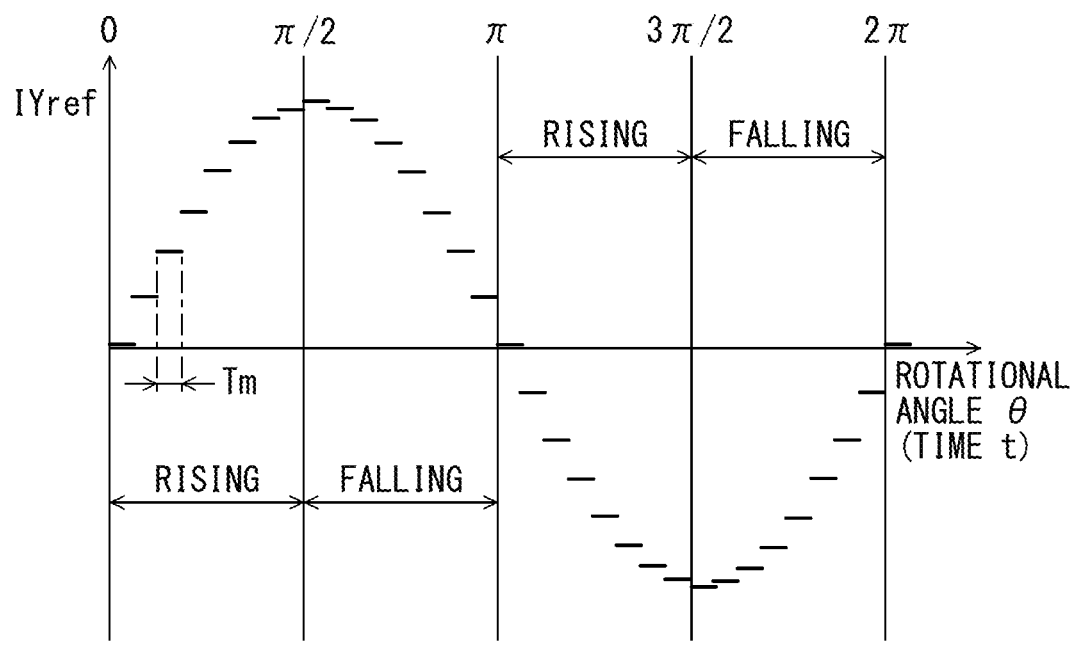
FIG. 4B is a diagram showing another example of the waveform diagram of the current reference value with respect to the rotational angle of the motor.

In FIG. 2, the current reference value Iref supplied from the bridge controller 107 to the D/A converter 115 is actually the current reference value IXref of the X phase and the current reference value IYref of the Y phase. FIGS. 4A and 4B show examples of setting of these current reference values IXref and IYref in one rotation of the stepping motor 120, that is, the rotational angle $\theta$ ranging from 0 to $2\pi$. As shown in the figures, the current reference values IXref and IYref are waveforms obtained by approximating the cosine curve and sine curve to stepwise waves. The method of driving the motor by setting the current reference value in this way is called a microstep method, and has a characteristic that the residual oscillation is small and the stability is excellent particularly at low speed rotation.

Also, the cycle in which the stepwise wave fluctuates is referred to as a microstep cycle Tm. The microstep cycle Tm is preferably the same as the PWM period, or an integral multiple thereof. Both of the current reference values IXref and IXref alternately repeat the rising side and the falling side as shown in the figure for each $\pi/2$ of the rotational angle $\theta$. Here, the "rising side" is a period in which the absolute value of the current reference values IXref and IXref is rising, and the "falling side" is a period in which the same absolute value is decreasing.

(Outline of Current Control: Rising Side)

Next, with reference to the waveform diagram shown in FIG. 5, an outline of current control in the rising side will be described.

Figure 5:
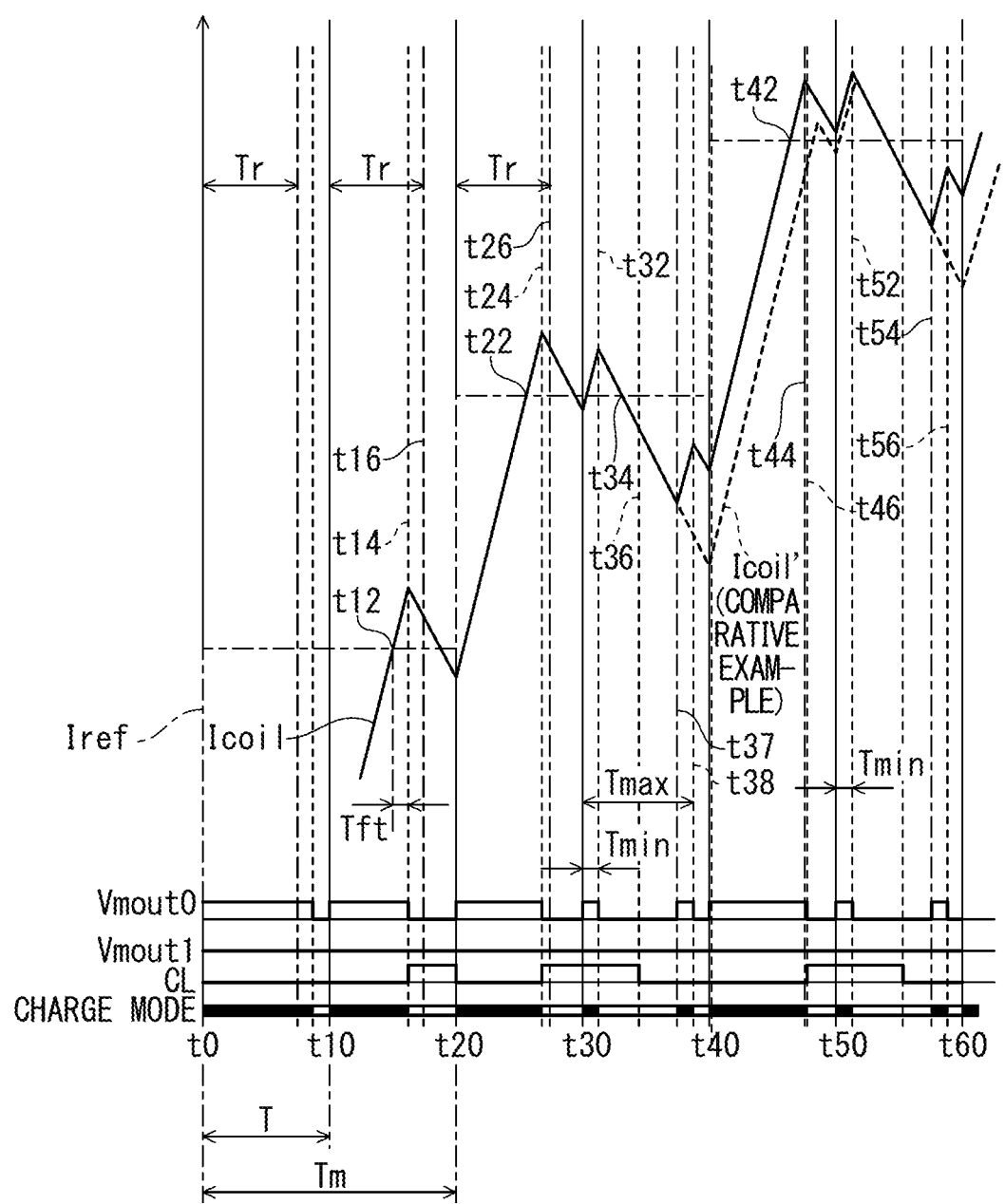
FIG. 5 is a waveform diagram of each part in a current rising side.

In FIG. 5, the times t0, t10, t20, t30, t40, t50, and t60 are the start times of the PWM period T. Further, the microstep cycle Tm is twice the PWM period T in the illustrated example, and the current reference value Iref fluctuates every microstep cycle Tm. In addition, FIG. 5 also shows the waveforms of the voltages VMout0 and VMout1 and the threshold excess flag CL. In the portion denoted as the "charge mode" shown at the bottom, the black line shows the period during which the operation mode is the charge mode, and the period of the other operation mode is indicated by outlined lines.

At time t10 to t12, the H-bridge circuit 20 is set to the charge mode (see FIG. 3A), and the measured current value Icoil increases with the lapse of time. At the time t12, the measured current value Icoil is equal to the current reference value Iref. However, as described with reference to FIG. 2, in order to exclude chattering, the current filter 111 waits for the filter time Tft after the output signal of the comparator 114 is switched, and when the value after switching is held, switches the threshold excess flag CL. Therefore, in FIG. 5, the threshold excess flag CL rises to "1" at the time t14 when the filter time Tft has passed since time t12.

When the threshold excess flag CL rises to "1", the operation mode of the H-bridge circuit 20 is basically switched to the slow decay mode (see FIG. 3D). This is to make the measured current value Icoil follow the current reference value Iref. Accordingly, also at time t14, according to this principle, the operation mode is switched to the slow decay mode. In the present embodiment, the slow decay mode is always selected for the decay mode during the rising side, and the fast decay mode (see FIG. 3B) is never selected.

Thereafter, when the time t16 is reached, the operation mode is reset again based on the threshold excess flag CL. Time t16 is the time when the predetermined time Tr has elapsed from the start time t10 of the PWM period. This predetermined time Tr is referred to as "current control re-execution time". The current control re-execution time Tr may be set to a time of about 25% to 75% of the PWM period T. Since the threshold excess flag CL remains "1" at time t16, the operation mode is held in the slow decay mode until the PWM period (time t10 to t20) ends.

When the next PWM period starts at time t20, the operation mode is set again to the charge mode, and the measured current value Icoil increases. At time t20, a new microstep cycle Tm has also begun, and the current reference value Iref is set to a value higher than before. When the measured current value Icoil becomes equal to the current reference value Iref at the time t22, the threshold excess flag CL rises to "1" at a time t24 when the filter time Tft has passed since that time point.

As a result, the operation mode transitions to the slow decay mode. Thereafter, when the current control re-execution time Tr is reached at the time t26, the threshold excess flag CL is referred to again. At this time point, since the threshold excess flag CL is still "1", the operation mode is held in the slow decay mode until the PWM period ends at time t30. Incidentally, before and after the time t30, the measured current value Icoil is less than the current reference value Iref for a short period. However, if this period is shorter than the filter time Tft, the threshold excess flag CL is held at "1".

As described above, when the threshold excess flag CL becomes "1", the operation mode is basically set to the slow decay mode. However, when a new PWM period is started at time t30, the operation mode is set to the charge mode even though the threshold excess flag CL is "1", and the measured current value Icoil increases until the time t30 to t32. Therefore, this reason will be explained. When the charge mode and the decay mode are repeated for each PWM period, the stepping motor 120 oscillates in the PWM period. When this oscillation frequency enters the audible range, since the oscillation is audible to a human being as unpleasant noise, the PWM period is set to a frequency shorter than the audible range. However, when a PWM period with no charge mode appears, a component of an integral multiple of the PWM period appears in the oscillation, so that the noise can be heard by the human being.

In order to prevent such a situation, in the present embodiment, at the beginning of each PWM period, the predetermined minimum duty time Tmin always selects the charge mode. The period from time t30 to t32 corresponds to the minimum duty time Tmin. Then, after the minimum duty time Tmin has elapsed, the operation mode is switched to the slow decay mode and the measured current value Icoil is decreased in response to the threshold excess flag CL being "1". At the time t34, the measured current value Icoil becomes less than the current reference value Iref, and at the time t36 when the filter time Tft has elapsed, the threshold excess flag CL falls to "0".

Time t37 is the timing at which the current control re-execution time Tr has passed in the PWM period. Since the threshold excess flag CL is "0" at this time, the operation mode is switched to the charge mode. Thereafter, the measured current value Icoil increases, but at the time t38, despite the fact that the threshold excess flag CL is still "0", the operation mode is switched to the slow decay mode and the measured current value Icoil decreases. Therefore, this reason will be explained.

In the present embodiment, the period during which the operation mode can be set to the charge mode is limited to the period from the start of each PWM period to the predetermined maximum duty time Tmax. Since the time t38 is the time when the maximum duty time Tmax has elapsed from the start time t30 of the PWM period, the operation mode is switched to the slow decay mode regardless of the value of the threshold excess flag CL. Here, the reason why the maximum duty time Tmax is provided is the same as the reason for providing the minimum duty time Tmin. That is, if there is a PWM period in the charge mode over the entire period, oscillation with a cycle of an integral multiple of the PWM period occurs and noise is heard by humans.

When the next PWM period starts at time t40, the operation mode is set again to the charge mode, and the measured current value Icoil increases. At time t40, a new microstep cycle Tm has also begun, and the current reference value Iref is set to a still higher value. When the time reaches the time t44 at which the current control re-execution time Tr has elapsed, the threshold excess flag CL is referred to again. At this time point, since the threshold excess flag CL is "0", the operation mode is held in the charge mode. Since the measured current value Icoil is equal to the current reference value Iref at the time t42, the threshold excess flag CL rises to "1" at the time t46 when the filter time Tft has passed since that time point.

As a result, the operation mode transitions to the slow decay mode. Thereafter, the operation mode is held in the slow decay mode until the time t50 when the PWM period ends. When the next PWM period starts at time t50, the operation mode is set to the charge mode until time t52 when the minimum duty time Tmin elapses, and is switched to the slow decay mode at time t52. Then, at the time t54 when the current control re-execution time Tr has passed in the PWM period, since the threshold excess flag CL is "0", the operation mode is switched to the charge mode. In the rising side, the above operation is repeated.

Here, as a comparative example, the measured current value Icoil' in the case where the re-evaluation of the threshold excess flag CL is "not executed", when the current control re-execution time Tr has elapsed, is indicated by a broken line. In this comparative example, since the operation mode is not switched to the charge mode at times t37 and t54, the current waveform largely drops. That is, since the ripple of the current waveform increases, torque loss, oscillation, and noise of the motor increase. On the other hand, according to the present embodiment, since the threshold excess flag CL is reevaluated when the current control re-execution time Tr elapses and the operation mode is switched as necessary, the delay of the rise of the measured current value Icoil can be reduced. In particular, a remarkable effect can be exerted in a period during which the current reference value Iref rises sharply (for example, the period in which the rotational angle $\theta$ is $\pi/2$ to $3\pi/4$, and $3\pi/2$ to $7\pi/4$ in FIG. 4A).

(Outline of Current Control: Falling Side)

Next, with reference to the waveform diagram shown in FIG. 6, the outline of current control in the falling side will be described.

Figure 6:
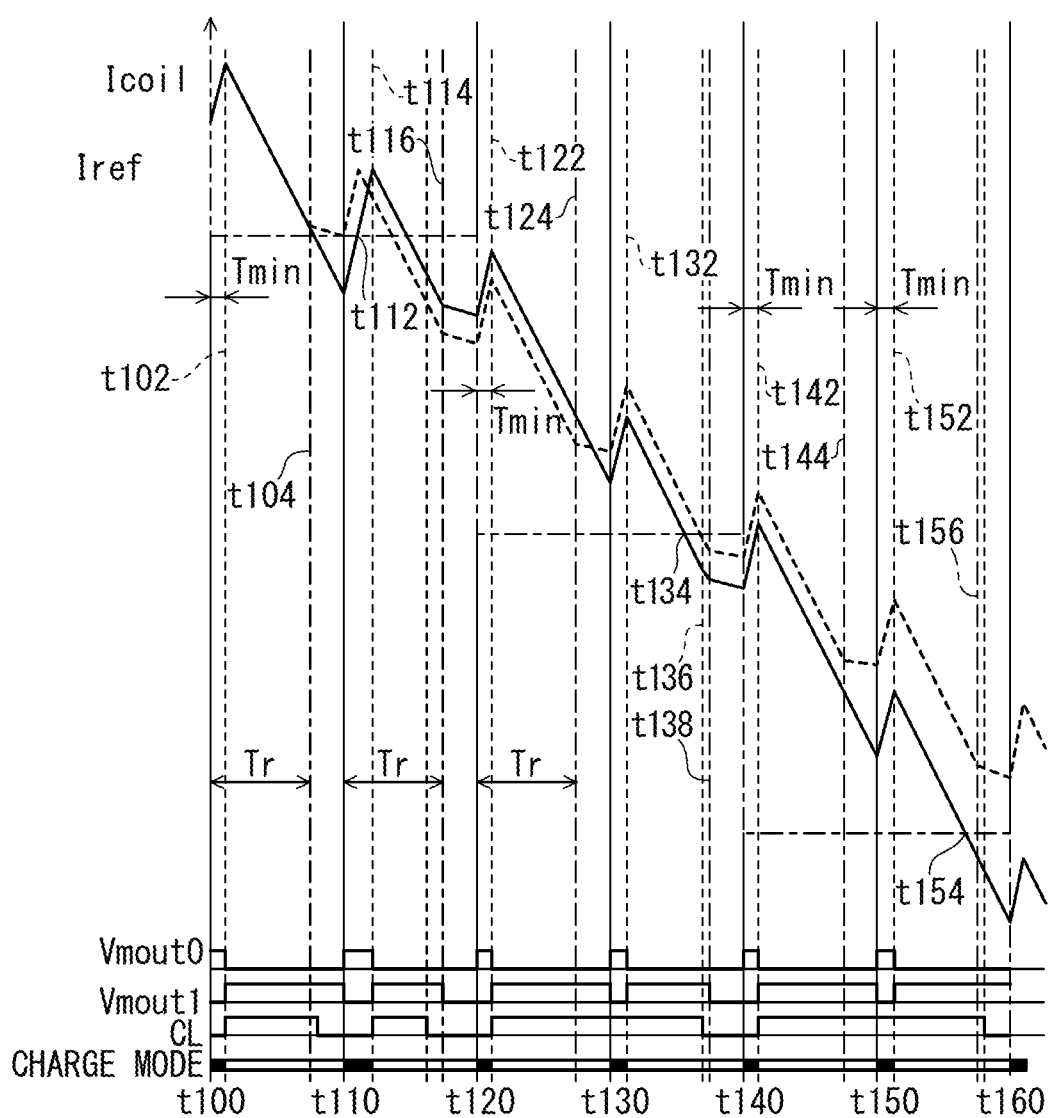
FIG. 6 is a waveform diagram of each part in a current falling side.

In FIG. 6, the times t100, t110, t120, t130, t140, t150, and t160 are the start times of the PWM period T. As in the case of the rising side described in FIG. 5, the microstep cycle Tm is twice the PWM period T also in the falling side. Also, the point that the minimum duty time Tmin, the maximum duty time Tmax and the current control re-execution time Tr are set is similar to that of the process for the rising side. However, during the falling side, both the fast decay mode and the slow decay mode can be selected as the decay mode.

When the PWM period starts at time t100 in FIG. 6, the operation mode is set to the charge mode until time t102 at which the minimum duty time Tmin elapses. At the time t102, the threshold excess flag CL is "1", but in the falling side, when the flag CL becomes "1", in principle, the operation mode is switched to the fast decay mode. Thereafter, when the time reaches the time t104 at which the current control re-execution time Tr has elapsed in the PWM period, the threshold excess flag CL is referred to. As shown in the figure, the threshold excess flag CL is "1" at time t104. In such a case, in the falling side, the fast decay mode is held as the operation mode. Accordingly, also in the illustrated example, the fast decay mode is held until the time t110 at which the PWM period ends.

When the next PWM period starts at time t110, the operation mode is switched to the charge mode, and the measured current value Icoil increases again. At the time t112, the measured current value Icoil reaches the current reference value Iref. Further, at the time t114 when the filter time Tft has elapsed, the threshold excess flag CL rises to "1". As a result, the operation mode is switched to the fast decay mode, and the measured current value Icoil decreases. Next, at the time t116 at which the current control re-execution time Tr has passed in the PWM period, the threshold excess flag CL is referred to again. In the illustrated example, the threshold excess flag CL is "0" at this point. In the falling side, in such a case, the operation mode is switched to the slow decay mode, and the slow decay mode is held until time t120 at which the PWM period ends.

Next, at time t120, a new PWM period is started, but at the same time a new microstep cycle Tm has also begun, and the current reference value Iref is set to a still lower value. At time t120, the operation mode is switched to the charge mode, and the measured current value Icoil increases. Thereafter, at the time t122 at which the minimum duty time Tmin has elapsed, since the threshold excess flag CL is "1", the operation mode is switched to the fast decay mode and the measured current value Icoil decreases. Next, at the time t124 when the current control re-execution time Tr has passed in the PWM period, the threshold excess flag CL is referred to again. Since the flag is "1" at this time point, the fast decay mode is held until time t130 when the PWM period ends.

Next, when a new PWM period starts at time t130, the operation mode is set to the charge mode until the time t132 when the minimum duty time Tmin elapses, and the measured current value Icoil increases. Since the threshold excess flag CL is "1" at time t 132, the operation mode is switched to the fast decay mode, and the measured current value Icoil decreases. At the time t134, the measured current value Icoil reaches the current reference value Iref. At the time t136 when the filter time Tft has elapsed, the threshold excess flag CL falls to "0". Next, when the flag CL is referred to at the time t138 when the current control re-execution time Tr has elapsed in the present PWM period, the operation mode is switched to the slow decay mode.

Next, at time t140, a new PWM period is started, but at the same time a new microstep cycle Tm has also begun, and the current reference value Iref is set to a still lower value. The operation from time t140 to t160 is the same as the operation from time t120 to t130. That is, the operation mode is the charge mode at times t140 to t142, the fast decay mode at times t142 to t150, the charge mode at times t150 to t152, and the fast decay mode at times t152 to t156.

Here, as a comparative example, the measured current value Icoil' in the case where the re-evaluation of the threshold excess flag CL is "not executed", when the current control re-execution time Tr has elapsed, is indicated by a broken line. In this comparative example, at the timing when the current control re-execution time Tr has passed, the operation mode is switched to the slow decay mode regardless of the value of the flag CL. In this comparative example, since the measured current value Icoil' cannot sufficiently follow the current reference value Iref, there still arises a problem that the torque loss, oscillation, and noise of the motor become large. On the other hand, according to the present embodiment, since the threshold excess flag CL is reevaluated when the current control re-execution time Tr elapses and the operation mode is switched as necessary, the delay of the fall of the measured current value Icoil can be reduced. Particularly, a remarkable effect can be exerted in the period during which the current reference value Iref steeply falls (for example, the period in which the rotational angle $\theta$ is $\pi/4$ to $\pi/2$, $5\pi/4$ to $3\pi/2$ in FIG. 4A.

[Details of Current Control] <Rising Side> (Process up to the Minimum Duty Time Tmin)

Figure 7:
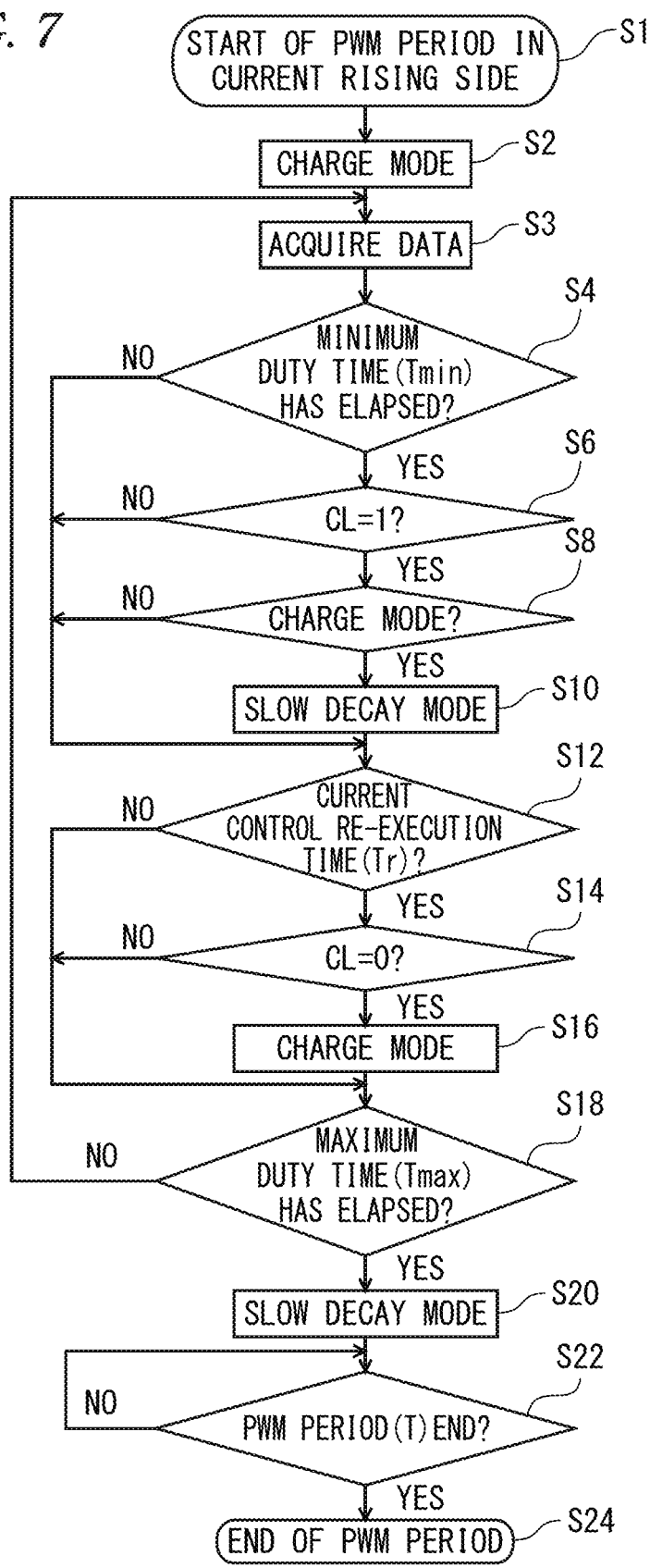
FIG. 7 is a flowchart of a current rising side control routine.

Next, the operation in the rising side will be described in detail with reference to FIG. 7. FIG. 7 is a flowchart of a rising side control routine, which is a control program stored in the ROM 103 and executed by the CPU 101, and is started every PWM period in the rising side.

In step S1 of FIG. 7, the process of the rising side control routine is started. In this step S1, the timer 104 is reset, and thereafter, the elapsed time after the start of the PWM period is counted. In step S1, on the basis of the estimated value of the rotational angle $\theta$ of the rotor 126 and the waveform shown in FIG. 4A or 4B, the current reference value Iref (the current reference value IXref or IYref in FIG. 4A or 4B) is determined, and the determined current reference value Iref is set in the bridge controller 107 (see FIG. 2). Next, in step S2, the operation mode is set to the charge mode. Next, when the process proceeds to step S3, the elapsed time indicated by the timer 104 and the threshold excess flag CL are acquired. In this routine, the elapsed time and the threshold excess flag CL do not change until the step S3 is executed again.

Next, when the process proceeds to step S4, it is determined whether or not the elapsed time after the start of the PWM period has passed the minimum duty time Tmin. Here, if "No" is determined, the process proceeds to step S12, and it is determined whether the elapsed time is equal to the current control re-execution time Tr or not. If "No" is determined in step S12, the process proceeds to step S18, and it is determined whether or not the elapsed time is equal to the maximum duty time Tmax. If "No" is determined in step S18, the process returns to step S3. Thereafter, the loop of steps S3, S4, S12, and S18 is repeated until the elapsed time exceeds the minimum duty time Tmin, and the operation mode is held in the charge mode.

(Process from Minimum Duty Time Tmin to Current Control Re-execution Time Tr)

When the minimum duty time Tmin elapses, "Yes" is determined in Step S4, and the process proceeds to Step S6. Here, it is determined whether or not the threshold excess flag CL is "1". If "Yes" is determined here, it is determined in step S8 whether the current operation mode is the charge mode or not. Further, if "Yes" is determined, the process proceeds to step S10, and the operation mode is switched to the slow decay mode. The change in the measured current value Icoil at the times t32 and t52 shown in FIG. 5 is a specific example in which the operation mode is switched to the slow decay mode with the minimum duty time Tmin elapsing in this manner.

On the other hand, if the threshold excess flag CL is "0" at the lapse of the minimum duty time Tmin, it is determined "No" in step S6, and thereafter, as long as the flag CL is "0", the loop of steps S4, S6, S12, and S18 is repeated, and the operation mode is held in the charge mode. When the flag CL becomes "1" before reaching the current control re-execution time Tr, "Yes" is determined in steps S6 and S8, and the operation mode is switched to the slow decay mode in step S10. The change in the measured current value Icoil at the times t14 and t24 shown in FIG. 5 is a specific example in which the operation mode is switched to the slow decay mode until the current control re-execution time Tr after the minimum duty time Tmin has elapsed. The change in the measured current value Icoil at the time t46 is a specific example in which the operation mode is switched to the slow decay mode after the current control re-execution time Tr after the minimum duty time Tmin elapses.

(Process at Current Control Re-Execution Time Tr)

If the threshold excess flag CL remains "0" until reaching the current control re-execution time Tr, the operation mode is held in the charge mode. Therefore, it can be seen that the operation mode at the current control re-execution time Tr is set to either the charge mode or the slow decay mode. When the elapsed time after the start of the PWM period becomes equal to the current control re-execution time Tr, "Yes" is determined in step S12, and the process proceeds to step S14. Here, it is determined whether or not the threshold excess flag CL is "0". Here, if "Yes" is determined, the process proceeds to step S16, and the operation mode is set to the charge mode.

That is, if the operation mode at the time of executing step S16 is the charge mode, the charge mode is held as it is. On the other hand, if the operation mode at the time of execution is the slow decay mode, the operation mode is switched to the charge mode. The change in the measured current value Icoil at the times t37 and t54 shown in FIG. 5 is a specific example in which the operation mode is switched from the slow decay mode to the charge mode at the current control re-execution time Tr as described above.

If the threshold excess flag CL is "1", it is determined "No" in step S14 and the previous operation mode is held as it is, but in this case, the previous operation mode is always in the slow decay mode. The reason is that if the threshold excess flag CL has become "1" in the charge mode, steps S6, S8, and S10 are executed beforehand and the operation mode always becomes the slow decay mode.

(Process from Current Control Re-Execution Time Tr to Maximum Duty Time Tmax)

In the above-described step S12, "Yes" is determined only at the timing when the elapsed time becomes equal to the current control re-execution time Tr, and "No" is determined in other cases. Here, if it is assumed that the operation mode at the current control re-execution time Tr is the slow decay mode, the step of switching the operation mode to another mode will not be executed thereafter. Therefore, the slow decay mode is held continuously after that.

On the other hand, when the operation mode at the current control re-execution time Tr is the charge mode, when the threshold excess flag CL subsequently becomes "1", the step S10 is executed via the steps S6 and S8, and the operation mode is switched to the slow decay mode. The change in the measured current value Icoil at the time t46 shown in FIG. 5 is a specific example in which the operation mode is switched to the slow decay mode by the maximum duty time Tmax after the current control re-execution time Tr has elapsed as described above.

(Process after Maximum Duty Time Tmax)

When the elapsed time after the start of the PWM period becomes equal to the maximum duty time Tmax, "Yes" is determined in step S18, and the process proceeds to step S20. Here, the operation mode is set to the slow decay mode. That is, if the previous operation mode was the charge mode, the mode is switched to the slow decay mode, and if the previous operation mode was the slow decay mode, the mode is held as it is. Next, in step S22, the process stands by until the PWM period ends. Therefore, the operation mode is held in the slow decay mode. If "Yes" is determined in step S22, the process in the routine is terminated in step S24.

<Falling Side>(Process up to the Minimum Duty Time Tmin)

Figure 8:
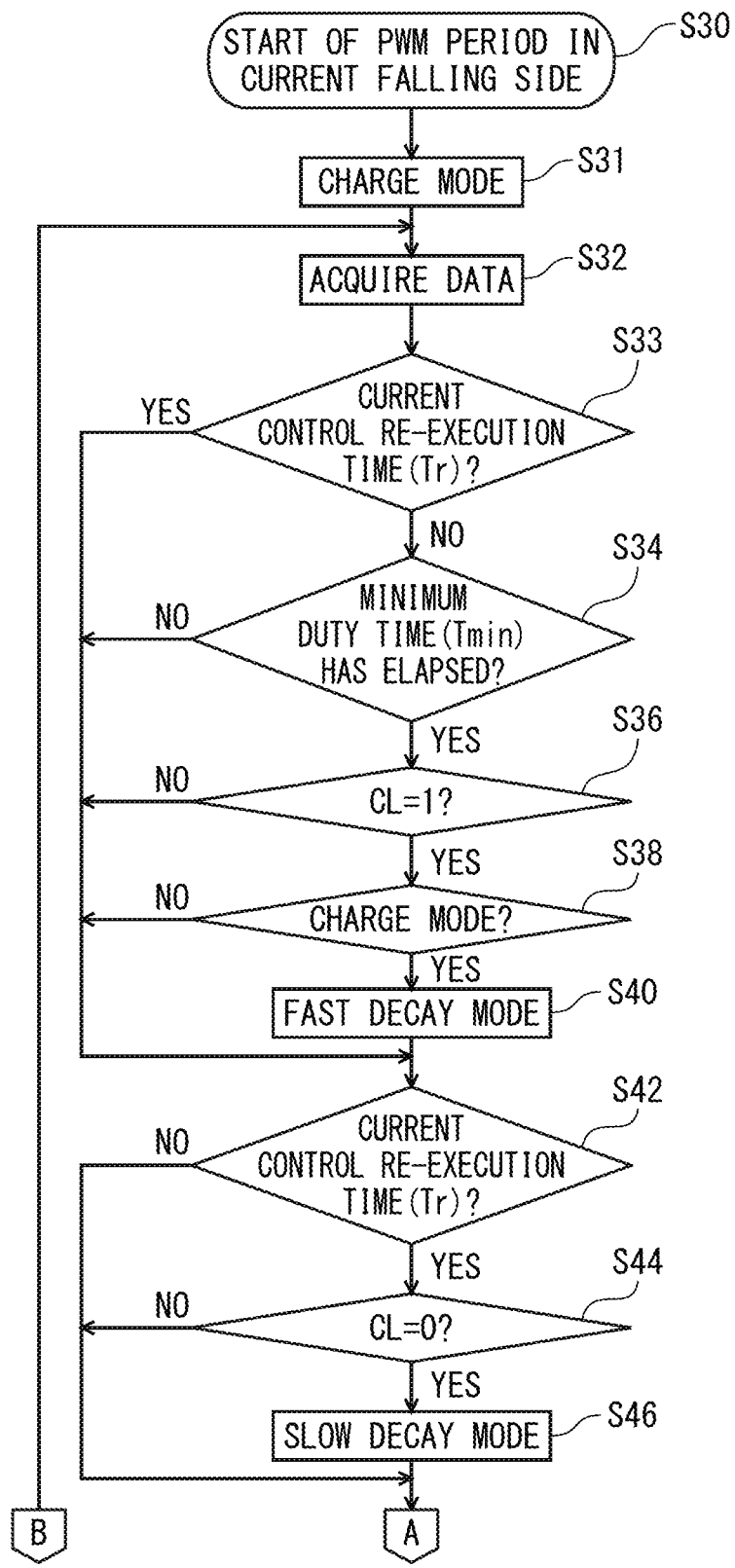
FIG. 8 is a flowchart (1/2) of a current falling side control routine.
Figure 9:
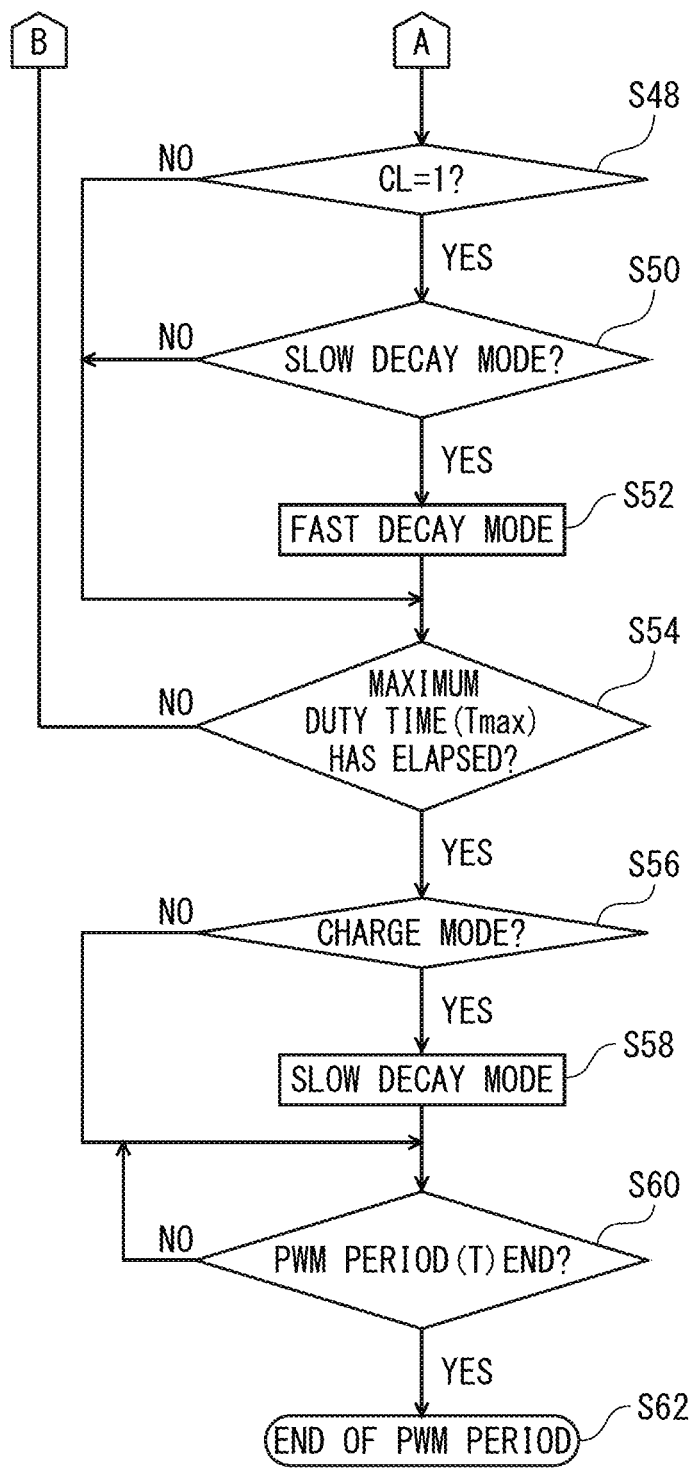
FIG. 9 is a flowchart (2/2) of the current falling side control routine.

Next, the details of the operation in the falling side will be described with reference to FIGS. 8 and 9. FIGS. 8 and 9 are flowcharts of the falling side control routine, which is a control program stored in the ROM 103 and executed by the CPU 101, and is started every PWM period in the falling side.

The process of the falling side control routine is started in step S30 of FIG. 8. In this step S30, the timer 104 is reset, and thereafter the elapsed time after the start of the PWM period is counted. In addition, in step S30, the current reference value Iref in the PWM period is determined based on the estimated value of the rotational angle θ of the rotor 126 and the waveform shown in FIG. 4A or 4B, and the determined current reference value Iref is set in the bridge controller 107 (see FIG. 2). Next, in step S31, the operation mode is set to charge mode. Next, when the process proceeds to step S32, the elapsed time indicated by the timer 104 and the threshold excess flag CL are acquired. In this routine, the elapsed time and the threshold excess flag CL do not change until step S32 is executed again.

Next, when the process proceeds to step S33, it is determined whether or not the elapsed time after the start of the PWM period exceeds the current control re-execution time Tr. Here, if "No" is determined, the process proceeds to step S34, and it is determined whether or not the elapsed time has passed the minimum duty time Tmin. If "No" is determined here, the process proceeds to step S42. Here, it is determined whether or not the elapsed time after the start of the PWM period has reached the current control re-execution time Tr. If "No" is determined here, the process proceeds to step S48 in FIG. 9. Here, it is determined whether or not the threshold excess flag CL is "1". Here, if "Yes" is determined, the process proceeds to step S50, and it is determined whether or not the operation mode is the slow decay mode.

Before the minimum duty time Tmin elapses, since the operation mode is always the charge mode, "No" is determined in step S50, and the process proceeds to step S54. If "No" is determined in step S48, the process directly proceeds to step S54. In step S54, it is determined whether or not the elapsed time after the start of the PWM period has passed the maximum duty time Tmax. If "No" is determined here, the process returns to step S32 in FIG. 8. Thereafter, the loop of steps S32, S33, S34, S42, S48, S50, and S54 is repeated until the elapsed time after the start of the PWM period exceeds the minimum duty time Tmin, and the operation mode is held in the charge mode.

(Process from Minimum Duty Time Tmin to Current Control Re-execution Time Tr)

After the minimum duty time Tmin has elapsed, "Yes" is determined in step S34, and the process proceeds to step S36. Here, it is determined whether or not the threshold excess flag CL is "1". If "Yes" is determined here, it is determined in step S38 whether or not the current operation mode is the charge mode. If "Yes" is further determined, the process proceeds to step S40, and the operation mode is switched to the fast decay mode. The change in the measured current value Icoil at the times t122, t132, t142, and t152 shown in FIG. 6 is a specific example in which the operation mode is switched to the fast decay mode with the minimum duty time Tmin elapsing as described above.

On the other hand, if the threshold excess flag CL is "0" after the elapse of the minimum duty time Tmin, "No" is determined in step S36, and the process returns to step S32 in FIG. 8 through steps S42, S48, and S54. Thereafter, as long as the flag CL is "0", the loop of steps S32 to S36, S42, S48, and S54 is repeated and the operation mode is held in the charge mode. Then, when the threshold excess flag CL becomes "1" before reaching the current control re-execution time Tr, "Yes" is determined in steps S36 and S38, and the operation mode is switched to the fast decay mode in step S40. The change in the measured current value Icoil at the time t114 shown in FIG. 5 is a specific example in which the operation mode is switched to the fast decay mode before the current control re-execution time Tr after the minimum duty time Tmin elapses.

(Process at Current Control Re-execution Time Tr)

If the threshold excess flag CL remains "0" until reaching the current control re-execution time Tr, the operation mode is held in the charge mode. Therefore, the operation mode at the current control re-execution time Tr should be set to either the charge mode or the fast decay mode. When the process proceeds to step S42 when the current control re-execution time Tr has elapsed, "Yes" is determined here, and the process proceeds to step S44. Here, it is determined whether or not the threshold excess flag CL is "0". Here, if "Yes" is determined, the process proceeds to step S46, and the operation mode is set to the slow decay mode. On the other hand, if the threshold excess flag CL is "1", the determination is "No" in step S44, and the previous operation mode (fast decay mode) is held as it is.

Therefore, when the process of steps S42 to S46 is executed in the current control re-execution time Tr, the operation mode is one of the fast decay mode and the slow decay mode. The change in the measured current value Icoil at the times t116 and t138 shown in FIG. 6 is thus a specific example in which the operation mode is switched from the fast decay mode to the slow decay mode at the current control re-execution time Tr. Further, the change in the measured current value Icoil at times t104, t124, and t144 in FIG. 6 is a specific example in which the previous fast decay mode is held as it is.

(Process from Current Control Re-execution Time Tr to Maximum Duty Time Tmax)

In the above-described step S42, "Yes" is determined only at the timing at which the elapsed time indicated by the timer 104 becomes equal to the current control re-execution time Tr, and "No" is determined in other cases. Since the current control re-execution time Tr has already elapsed, it is always determined "Yes" in step S33.

On the other hand, also in the period from the current control re-execution time Tr to the maximum duty time Tmax, the process of steps S48 to S52 in FIG. 9 is executed. This corresponds to the case where the current increases in the slow decay mode. That is, when the threshold excess flag CL becomes "1", the process proceeds to step S50, and it is determined whether or not the operation mode is the slow decay mode. Here, if "Yes" is determined, the process proceeds to step S52, and the operation mode is switched to the fast decay mode.

(Process after Maximum Duty Time Tmax)

When the elapsed time becomes equal to the maximum duty time Tmax, "Yes" is determined in step S54, and the process proceeds to step S56. Here, it is determined whether or not the operation mode is the charge mode. Here, if "Yes" is determined, the process proceeds to step S58, and the operation mode is set to the slow decay mode. Therefore, when the process of steps S56 and S58 ends, the operation mode is one of the fast decay mode and the slow decay mode. Next, in step S60, the process stands by until the PWM period ends. Therefore, the operation mode is held in the fast decay mode or the slow decay mode. When the elapsed time reaches the PWM period T, if "Yes" is determined in the step S60, the process of this routine ends in a step S62.

As described above, the motor current control device 100 of this embodiment includes:

the H-bridge circuit (20) that includes the switching elements (2, 4, 6, and 8) and is connected to the motor coil (124) provided in the motor, and a controller (101) that drives the switching elements (2, 4, 6, and 8) at every predetermined PWM period and designates an operation mode from among a plurality of modes including a charge mode, in which a motor current (Icoil) flowing in the motor coil (124) increases, a fast decay mode, in which the motor current (Icoil) is decreased, and a slow decay mode, in which the motor current (Icoil) is decreased at a decay speed slower than that of the fast decay mode for the H-bridge circuit (20), wherein the controller (101) selects one of the operation modes based on a comparison result between the motor current (Icoil) and a current reference value (Iref) before an elapsed time from the start of each PWM period reaches a predetermined current control re-execution time (Tr), and selects one of the operation modes based on a comparison result between the motor current (Icoil) and the current reference value (Iref) after the elapsed time reaches the current control re-execution time (Tr).

Further, the controller (101) in the motor control device 100 sets the operation mode to the charge mode until the minimum duty time (Tmin) shorter than the current control re-execution time (Tr) has elapsed from the start of each PWM period.

In the period during which the current reference value (Iref) is rising, the motor current (Icoil) reaches the current reference value (Iref) before the current control re-execution time (Tr) after the minimum duty time (Tmin)) or less (flag CL=1), the operation mode is set to the slow decay mode (t14, t24, S4 to S10), and when it is detected that the operation mode is the slow decay mode and the motor current (Icoil) has become less than the current reference value (Iref) (flag CL=0) in the current control re-execution time (Tr), the operation mode is switched to the charge mode (t37 and t54, S12 to S16).

Further, in a period in which the current reference value (Iref) is decreasing, when it is detected that the motor current (Icoil) becomes the current reference value (Iref) or higher before the current control re-execution time (Tr) after the minimum duty time (Tmin) (flag CL=1) the controller (101) sets the operation mode to the fast decay mode (t114, S34 to S40), and in the current control re-execution time (Tr), when it is detected that the motor current (Icoil) is less than the current reference value (Iref) (flag CL=0), the controller sets the operation mode to the slow decay mode (t116 and t138, S42 to S46).

Further, the control program (FIGS. 7 to 9) in the present embodiment executes:

a step of setting a current reference value (Iref) for each PWM period based on the positional relationship (rotational angle θ) between the rotor (126) and the stators (122XP, 122XN, 122YP, and 122YN) of the motor (S1, S30), a step of selecting one of the operation modes based on a comparison result between the motor current (Icoil) and the current reference value (Iref) before the elapsed time from the start of each PWM period reaches a predetermined current control re-execution time (Tr) (S4 to S10 and S34 to S40), and a step of selecting one of the operation modes based on the comparison result between the motor current (Icoil) and the current reference value (Iref) after the current control re-execution time (Tr) has elapsed in each PWM period (S12 to S16 and S42 to S46).

[Advantages of the Embodiment]

With the above configuration, the effects of the present embodiment are as follows. (1) Since the motor control is performed by one comparator 114 with respect to one stator winding 124 (see FIG. 2), the motor control device 100 can be constructed at low cost. (2) In one PWM period, since the operation mode of the H-bridge circuit 20 can be switched a plurality of times based on the threshold excess flag CL, the current ripple of the motor current can be suppressed. As a result, it is possible to increase the drive efficiency of the motor, and it is possible to reduce torque loss, noise, oscillation, and the like of the motor. (3) Since it is possible to switch the operation mode a plurality of times in one PWM period, it is possible to suppress a large delay of the motor current with respect to the current reference value Iref. Thus, the PWM period can be lengthened, and the motor control device 100 can be constructed inexpensively.

[Modification]

The present invention is not limited to the above-described embodiment, and various modifications are possible. The above-described embodiments are exemplified for easy understanding of the present invention, and are not necessarily limited to those having all the configurations described. In addition, a part of the configuration of one embodiment can be replaced by the configuration of another embodiment, and the configuration of another embodiment can be added to the configuration of one embodiment. Further, it is possible to add, delete, and replace other configurations with respect to a part of the configuration of each embodiment. Possible modifications to the above embodiment are as follows, for example.

(1) In the above embodiment, the minimum duty time Tmin, the maximum duty time Tmax, and the current control re-execution time Tr may not be constant. That is, these times may be set according to the positional relationship (for example, microstep number) between the rotor 126 and the stators 122XP and 122XN. Further, different values may be used in the rising side and the falling side. (2) In the above-described embodiment, resetting of the operation mode at the current control re-execution time Tr is executed once for one PWM period, but by setting a plurality of current control re-execution times Trs, resetting of the operation mode may be executed a plurality of times for one PWM period.

(3) Although the process shown in FIGS. 7 to 9 has been described as software-like process using a program in the above embodiment, it may also be realized as hardware-like process using an ASIC (Application Specific Integrated Circuit) or an FPGA (field-Programmable gate array) or the like.

(4) In the above embodiment, the FET is applied as the switching element constituting the H-bridge circuit 20, but in place of FET, a bipolar transistor, an IGBT (Insulated Gate Bipolar Transistor), and other switching elements may be applied. (5) In the above embodiment, the bipolar type two-phase stepping motor is applied as the stepping motor 120, but various types of stepping motors 120 and the number of phases can be applied depending on the application. In the above described embodiment, the microstep method is adopted as the setting method of the current reference value Iref. However, a value continuously changing with respect to the rotational angle θ may be used as the current reference value Iref.

LIST OF REFERENCE NUMERALS 2, 4, 6, 8, 15, 17: FET (switching element)
12,14,16,18: diode
20, 20X, 20Y: H-bridge circuit
100: motor control device
101: CPU (controller)
102: RAM
103: ROM
104: timer
105: I/O port
106: bus
107: bridge controller
110: bridge control circuit
111: current filter
112: current limit controller
113: PWM signal generator
114: comparator
115: D/A converter
116: current detector
117: A/D converter
118: BEMF detector
120: stepping motor
122YP, 122XN, 122YN, 122XP: stator
124, 124X, 124Y: stator winding (motor coil)
126: rotor
130: host device
140: DC power supply
142: ground wire

The invention claimed is:

1. A motor control device comprising:
an H-bridge circuit that includes a switching element for switching an operation mode and is connected to a motor coil provided in a motor, the operation mode including a charge mode, in which a motor current flowing in the motor coil increases, a fast decay mode, in which the motor current is decreased, a slow decay mode, in which the motor current is decreased at a decay speed slower than that of the fast decay mode for the H-bridge circuit, and a shoot through protection mode for preventing the H-bridge circuit from a short circuit; and a controller that drives the switching element at every predetermined PWM period and designates the operation mode from among a plurality of modes including the charge mode, the fast decay mode, and the slow decay mode, wherein before an elapsed time from a start of a pulse in each PWM period reaches a predetermined current control re-execution time, which is set to be shorter than each PWM period, the controller switches the H-bridge circuit to start operation in one of the operation modes based on a comparison result between the motor current and a current reference value, wherein the comparison result between the motor current and the current reference value comprises a determination of whether or not the motor current reaches the current reference value, wherein after the elapsed time reaches the current control re-execution time and before an end of each PWM period, the controller switches the H-bridge circuit to start operation in one of the operation modes based on a comparison result between the motor current and the current reference value, wherein the comparison result between the motor current and the current reference value comprises a determination of whether or not the motor current reaches the current reference value, and wherein the operation mode is switched to start operation in one of the operation modes based on a comparison result between the motor current and the current reference value when the elapsed time reaches the current control re-execution time, wherein the comparison result between the motor current and the current reference value comprises a determination of whether or not the motor current reaches the current reference value.

2. The motor control device according to claim 1, wherein the controller switches the H-bridge circuit to start operation in the charge mode until a minimum duty time shorter than the current control re-execution time has elapsed from the start of each PWM period.

3. The motor control device according to claim 1, further comprising:

a current generator that generates a current proportional to a current flowing in the switching element; and a current detector that measures a value of the current generated in the current generator according to a direction in which the current flows, the value of the current being used as a measured current value of the motor current, wherein based on the current generated in the current generator and measured by the current detector, the controller: switches the H-bridge circuit to start operation in one of the operation modes based on the comparison result between the motor current and the current reference value before the elapsed time from the start of the pulse in each PWM period reaches the predetermined current control re-execution time; and switches the H-bridge circuit to start operation in one of the operation modes based on the comparison result between the motor current and the current reference value after the elapsed time reaches the current control re-execution time and before the end of each PWM period.

4. The motor control device according to claim 2 wherein, when it is detected that the motor current becomes equal to or higher than the current reference value before the current control re-execution time after the minimum duty time in a period during which the current reference value is rising, the controller switches the H-bridge circuit to start operation in the slow decay mode, and wherein, when it is detected that the operation mode is the slow decay mode and the motor current becomes less than the current reference value in the current control re-execution time, the controller switches the H-bridge circuit to start operation in the charge mode.

5. The motor control device according to claim 2 wherein, when it is detected that the motor current becomes equal to or higher than the current reference value before the current control re-execution time after the minimum duty time in a period during which the current reference value is decreasing, the controller switches the H-bridge circuit to start operation in the fast decay mode, and wherein, when it is detected that the motor current becomes less than the current reference value in the current control re-execution time, the controller switches the H-bridge circuit to start operation in the slow decay mode.

6. A motor controlling method for controlling a motor control device including: an H-bridge circuit that includes a switching element for switching an operation mode and is connected to a motor coil provided in a motor, the operation mode including a charge mode, in which a motor current flowing in the motor coil increases, a fast decay mode, in which the motor current is decreased, a slow decay mode, in which the motor current is decreased at a decay speed slower than that of the fast decay mode for the H-bridge circuit, and a shoot through protection mode for preventing the H-bridge circuit from a short circuit; and a controller that drives the switching element at every predetermined PWM period and designates the operation mode from among a plurality of modes including the charge mode, the fast decay mode, and the slow decay mode, the method comprising:

setting a current reference value for each PWM period based on a positional relationship between a rotor and a stator of the motor;

switching the H-bridge circuit to start operation in one of the operation modes based on a comparison result of the motor current and the current reference value before an elapsed time from a start of a pulse in each PWM period reaches a predetermined current control re-execution time, which is set to be shorter than each PWM period; and switching the H-bridge circuit to start operation in one of the operation modes based on a comparison result of the motor current and the current reference value after the current control re-execution time has elapsed in each PWM period and before an end of each PWM period, wherein the operation mode is switched to start operation in one of the operation modes based on a comparison result between the motor current and the current reference value when the elapsed time reaches the current control re-execution time.

7. A motor control device comprising:

an H-bridge circuit that includes a switching element and is connected to a motor coil provided in a motor; and a controller that drives the switching element at every predetermined PWM period and designates an operation mode from among a plurality of modes including a charge mode, in which a motor current flowing in the motor coil increases, a fast decay mode, in which the motor current is decreased, and a slow decay mode, in which the motor current is decreased at a decay speed slower than that of the fast decay mode for the H-bridge circuit, wherein the controller switches the H-bridge circuit to start operation in one of the operation modes at least twice in each PWM period—once before an elapsed time from a start of a pulse in each PWM period reaches a predetermined current control re-execution time, which is set to be shorter than each PWM period, and again after the elapsed time reaches the current control re-execution time and before an end of each PWM period, based on a comparison result between the motor current and a current reference value, wherein the comparison result between the motor current and the current reference value comprises a determination of whether or not the motor current reaches the current reference value, and wherein the operation mode is switched to start operation in one of the operation modes based on a comparison result between the motor current and the current reference value when the elapsed time reaches the current control re-execution time.

* * * * *